Dec. 13, 1938.   B. S. WATLING   2,139,920
COUNTING REGISTER FOR COIN CONTROLLED MECHANISMS
Filed July 24, 1937   2 Sheets-Sheet 1

Inventor:
Burns S. Watling,
By Fisher, Clapp, Soans & Pond,
Attorneys.

Witnesses:
Wm. E. Anderson,
H. J. Aikut

Dec. 13, 1938.  B. S. WATLING  2,139,920
COUNTING REGISTER FOR COIN CONTROLLED MECHANISMS
Filed July 24, 1937    2 Sheets-Sheet 2
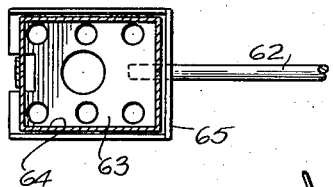
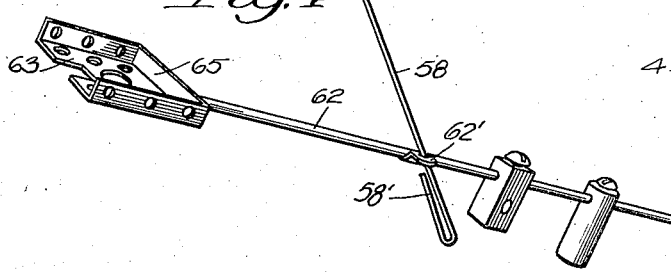
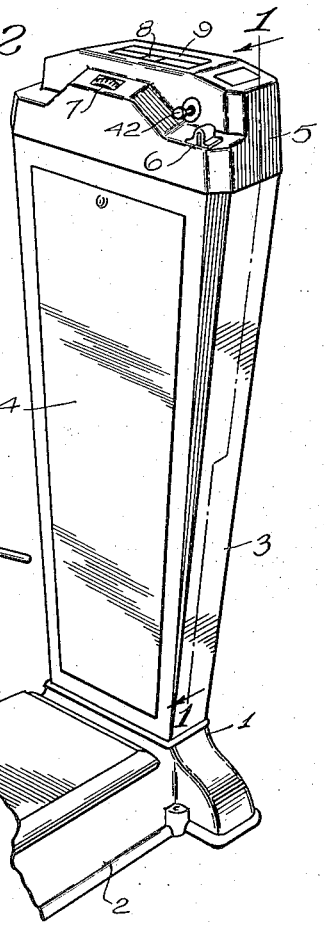
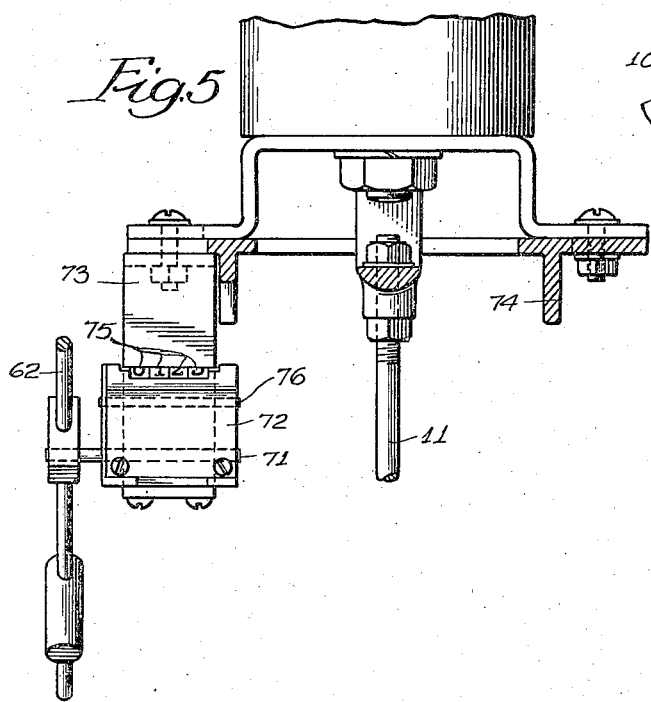

Patented Dec. 13, 1938

2,139,920

UNITED STATES PATENT OFFICE 2,139,920

COUNTING REGISTER FOR COIN CONTROLLED MECHANISMS

Burns S. Watling, Chicago, Ill., assignor to Watling Scale Company, Chicago, Ill., a corporation of Illinois Application July 24, 1937, Serial No. 155,380

3 Claims. (Cl. 194—21)

This invention relates to coin-controlled mechanisms having recording or registering devices for counting the number of inserted coins, and the invention is particularly adapted for use in connection with weighing scales, amusement or fortune-telling apparatus, and the like.

In such apparatus, the operating mechanism is usually normally locked by a latch which is released by the deposit of a coin of the proper size and denomination. Such devices are frequently sold by the manufacturer to an operator who places them without cost in stores, railway stations, places of amusement and other public places, on the condition that the operator shall receive a certain share of the proceeds.

In many cases, the owners or operators of such machines have been defrauded by unscrupulous lessees or bailees who have removed the counting devices from the machines during those periods in which it is reasonably certain that the owner's agent will not call for the purpose of reading the register.

The perpetration of such frauds is rendered impossible with devices embodying this invention, the main object of which is to provide a coin-controlled mechanism and register in which the register is so mounted that its removal will completely disable the machine.

An illustrative embodiment of this invention is shown in the accompanying drawings, wherein:—

Figure 2 is a perspective of the weighing scale having a portion of the base and platform broken away;

Figure 3 is a sectional detail of the coin carriage of the register operating arm, the view being taken on the line 3—3 of Figure 1;

Figure 4 is a perspective of the arm which operates the register and the release mechanism;

Figure 5 is an enlarged fragmentary section taken on the line 5—5 of Figure 1.

Figure 1:
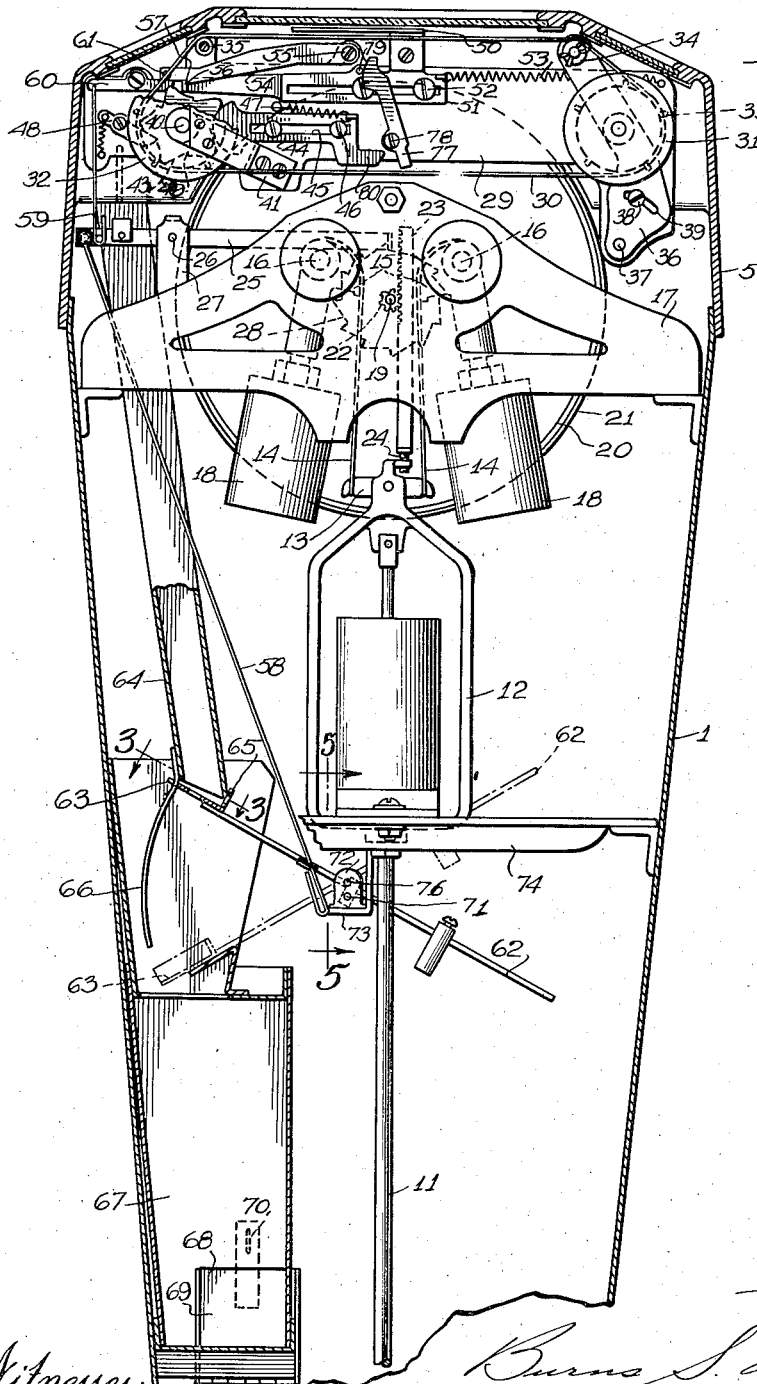
Figure 1 is a fragmentary rear elevation of a weighing scale with the improvement applied thereto and with the casing or housing and certain other portions shown in section.

In the embodiment herein shown, the invention is applied to a weighing scale and fortune-telling device which has the general construction shown in Patent No. 1,923,287, issued August 22, 1933, to Thomas W. B. Watling.

In the form illustrated, the weighing scale comprises a frame or housing 1 having a base portion 2 and upright portion 3 provided with a removable front panel 4 and back panel, not shown, and having a cap or head 5 which is provided with the usual coin inlet opening 6 and glazed sight openings 7, 8, and 9.

The scale includes the usual platform 10 which is connected to a weight-operated, vertically disposed rod 11 having a yoke 12 at its upper end. Pivotally mounted on the upper end of the yoke 12 is a cross bar 13 connected to the lower ends of a pair of straps 14 which extend over and are secured to cam-shaped sectors 15 fixed on a pair of shafts 16 which are journalled in a cross frame 17 and which carry pendulum weights 18 which are adapted to swing outwardly away from each other for counterbalancing a weight placed upon the scale platform.

Journalled in the cross frame 17, is a shaft 19 which carries an indicating drum 20 having a scale 21 on its periphery which is exposed to view through the glazed opening 7 in the cap 5. Fixed on the shaft 19 is a pinion 22 which engages a rack 23, the lower end of which engages an adjustable stop screw 24 mounted on the upper extremity of the yoke 12.

Movement of the drum 20 is normally prevented by a latch 25 pivoted at 26 to an arm 27 of the cross frame 17. The pivoted latch 25 is mounted so that its inner end normally drops into engagement with a ratchet wheel 28 fixed on the shaft 19 so as to lock the drum 20 against rotation. When the latch 25 is released and a weight placed upon the platform 10, the rod 11 and yoke 12 descend, and the rack 23 drops until it engages the adjustable stop 24. The downward movement of the rack 23 rotates the drum 20 for positioning the proper numbers on the scale 21 directly below the sight opening 7. The teeth on the ratchet 28 are so shaped that the latch 25 does not interfere with the return movement of the parts when the weight is removed from the scale platform.

The amusement or fortune-telling apparatus is mounted on the rear face of a supporting plate 29 which is mounted in the upper rear portion of the cap 5. The fortune-telling apparatus includes an endless flexible band 30 which extends around a pair of drums 31 and 32 and which is preferably provided with spaced perforations, not shown, for engaging teeth 33 on the drums. The upper reach of the band 30 extends over a pair of guide rollers 34 and 35 so as to pass below and adjacent the two glazed sight openings 8 and 9. The band 30 carries a rear row or series of questions, not shown, which are exposed through the elongated opening 9, and it also carries a front row or series of answers which, as the band is moved, are alined one at a time with the small view opening 8.

The drum 31 and the adjacent guide roller 34 are mounted on a bracket 36 which is pivotally secured to the supporting plate 29 by means of a pin 37. A set screw 38 mounted on the supporting plate 29 extends through an arcuate slot 39 in the bracket 36 for locking the bracket in its adjusted position.

The other guide roller 35 is mounted on the supporting plate 29, and the drum 32 is fixed on a shaft 40 which is journalled at its front end in the supporting plate 29 and at its rear end in a bracket 41 which is fixed to and projects rearwardly from the plate 29. The shaft 40 also projects forwardly through an opening in the cap 5 and is provided with an operating knob 42 by which it and the drum 32 may be rotated for shifting the band 30. Fixed on the shaft 40 of the drum 32 is a star-shaped cam 43 which is disposed between the plate 29 and the adjacent end of the drum 32. Engaging the periphery of the cam 43, is a dog 44 having a slot 45 through which extend a pair of guide pins 46 mounted on the plate 29. The dog 44 is normally urged into operative engagement with the cam 43 for yieldingly holding the band 30 in its adjusted position by means of a spring 47 connected at one end to the dog 44 and at its other end to the plate 29.

Preferably also a spring held detent 48 pivoted on the plate 29 engages notches 49 in the star cam 43 so that the flexible band 30 can be moved in only one direction.

The forward portion of the flexible band which bears the printed answers to the questions is normally hidden from view by means of a shutter 50 mounted on a bar 51 which is slidably mounted on a pair of guide pins 52 mounted on the supporting plate 29. In the normal position of the shutter, shown in Figure 1, the band is not visible through the opening 8 but, in the shifted position of the shutter, an opening, not shown, in the shutter is alined with the opening 8 so as to expose one of the answers to view. The shutter is opened by means of a spring 53 connected to the plate 29. The shutter 50 and its slide 51 are held in normal closed position against the action of the spring 53 by means of a latch 54 pivoted at 55 to the plate 29 and having a shoulder 56 which is arranged to engage an inwardly offset lug 57 on the outer end of the slide 51.

In order that the weight-indicating drum 20 and shutter 50 may be actuated, it is necessary to trip the latches 25 and 54. In the construction herein illustrated, this is accomplished by coin controlled mechanism which includes a pull link 58 which is pivotally connected at its upper end to the outer end of the latch 25. Also connected to the latch 25, is a pull link 59 which is pivotally connected at its upper end to the outer end of a tripping lever 60 pivoted on the plate 29. The inner end of the tripping lever 60 is positioned for engagement with a pin 61 on the outer end of the latch 54 for raising the latch 54 out of engagement with the shoulder 57 of the slide 51.

The lower end of the link 58 has a lost motion connection with a pivoted counter-balanced arm 62, one end of which is provided with a perforated shelf 63 which is located directly below a coin chute 64 which communicates at its upper end with the coin inlet 6 of the cap 5. As most clearly shown in Fig. 4, this lost motion connection consists of an apertured lug 62' on the arm 62 through which the lower portion of the link 58 is passed, and the underlying portion of the link is then folded on itself to form a loop 58' that has the function of a contact lug through which the arm 62, as it swings downwardly to the dot-and-dash position shown in Fig. 1, pulls the link 58 downwardly, and as it returns to its elevated position permits the link 58 to rise to the position shown in Fig. 1. The arrangement is such that a coin of proper size and denomination dropping through the chute 64 will strike the shelf 63 and will swing the arm 62 to the dotted line position of Figure 1 so as to pull the links 58 and 59 downwardly for releasing the latches 25 and 54. During the downward movement of the shelf 63, the coin is secured against displacement by flanges 65 extending around three sides of the shelf and by a curved guide bar 66 depending from the lower end of the chute 64. At the lower limit of the movement of the shelf, the coin is free to slide into a magazine or receptacle 67 which may be provided with a suitable opening 68 at its lower end for removal of the coins. The opening 68 may be closed by a gate or door 69 having a suitable lock 70. The shelf 63 is perforated so as to prevent operation of the arm 62 by air blown downwardly through the coin chute 64.

The counter-balanced arm 62 is fixed on the shaft 71 of a counting device or register 72 which is supported on a depending arm 73 secured to horizontal bracket 74 mounted on the casing 1. The register 72 may be of any suitable construction. In the form shown, it includes a plurality of indicating drums 75 mounted on a shaft 76 and operated by the shaft 71. In view of the fact that the specific details of construction of the operating parts of the register do not constitute a part of the present invention, they have not been illustrated. Many different types of register may be successfully employed.

In view of the fact that the counter-balanced arm 62 is connected to one of the shafts of the register which forms the fulcrum of the arm 62, the register cannot be surreptitiously removed from the machine without disabling the coin controlled mechanism, thereby rendering the scale and fortune-telling device inoperative.

In operation, the parts normally assume the positions shown in full outline in Figure 1. When a person standing on the scale platform 10 inserts a suitable coin through the inlet opening 6, the coin drops through the chute 64 and onto the shelf 63, thereby rocking the arm 62 for depressing the links 58 and 59 so as to raise the latches 25 and 54 from the ratchet 28 and lug 57, respectively, whereupon the drum 20 is free to rotate and the shutter 50 is free to move to its open position under the action of the spring 53. Each complete stroke of the counter-balanced arm 62 actuates the register so as to record the number of coins which are inserted into the machine.

As soon as the coin drops from the shelf 63 into the receptacle 67, the counter-balance on the arm 62 will return said arm to the full line position shown in Fig. 1, the latch lever 25 will return to the normal position shown in Fig. 1 under the superior weight of its long arm which is sufficient to raise link 58, the tripping lever 60 will return to the normal position shown in Fig. 1 under the weight of the latch bar 54 and its pin 61 resting on the inner end of lever 60, and, when the user steps from the scale platform, the counterweights 18 will return the weighing apparatus and indicator 21 to normal position but the shutter 50 will remain in its open position. Means are, however, provided for closing the shutter when the flexible band is again operated. For this purpose, an arm 77 is pivotally secured to the plate 29 by a pin 78, and its upper cam-shaped end is arranged to engage a pin 79 on the slide 51. When the slide is moved under the action of the spring 53 to open the shutter, the lower end of the arm 77 is moved against an extension or lug 80 on the inner end of the dog 44. When the band is again adjusted to select a question, the rotation of the cam 43 will move the dog 44 inwardly, thereby rocking the arm 77 so as to shift the slide 51 into engagement with the latch 54 for closing the shutter.

Although but one specific embodiment of this invention has been herein shown and described, it will be understood that details of the construction shown may be altered without departing from the spirit of the invention as defined by the following claims.

I claim:

1. In an apparatus of the class described, the combination of a movable member, mechanism for moving said member, a latch normally locking said member against movement in one direction, a counting register, and coin-controlled latch retracting and register operating means, including a lever fulcrumed on and connected to said register to operate the same and adapted to be rocked by a deposited coin and means connecting said lever and latch for retracting the latter when said lever is rocked by said coin.

2. In an apparatus of the class described, the combination of a movable member, mechanism for moving said member, a latch normally locking said member against movement in one direction, a counting register having a rotatable operating shaft forming a part thereof, and coin-controlled latch retracting and register operating means, including a lever fast on said shaft and adapted to be rocked by a deposited coin and a link connecting said lever and latch for retracting the latter when said lever is rocked by said coin.

3. In a coin-controlled weighing scale, the combination of a movable weight indicating member, mechanism for moving said member, a pivoted latch bar normally locking said member against movement in one direction, a counting register having a rotatable operating shaft forming a part thereof, a coin chute, and coin-controlled latch retracting and register operating means, including a counter-weighted lever fast on said shaft with one end thereof underlying said chute, said lever adapted to be rocked by a coin falling through said chute, and a pull link pivotally suspended from said latch bar and articulated with said lever to be drawn downwardly by the latter on its rocking movement and thereby retract said latch bar from locking engagement with said weight indicating member.

BURNS S. WATLING.